United States Patent
Evans et al.

(10) Patent No.: US 8,344,870 B2
(45) Date of Patent: Jan. 1, 2013

(54) VIRTUAL DASHBOARD

(75) Inventors: Dave Evans, Los Altos Hills, CA (US); James Vila, Danville, CA (US); Marc J. P. Giradot, Paris (FR); Michael M. Schwarz, Schaeftlarn (DE)

(73) Assignee: Cisco Technology, Inc., San Jose, CA (US)

(*) Notice: Subject to any disclaimer, the term of this patent is extended or adjusted under 35 U.S.C. 154(b) by 407 days.

(21) Appl. No.: 12/575,399

(22) Filed: Oct. 7, 2009

(65) Prior Publication Data
US 2010/0127847 A1 May 27, 2010

Related U.S. Application Data

(60) Provisional application No. 61/103,564, filed on Oct. 7, 2008.

(51) Int. Cl.
*G09F 9/00* (2006.01)
(52) U.S. Cl. ............. 340/461; 340/539.11; 345/173; 701/29.1
(58) Field of Classification Search ......... 340/459–462, 340/572.1, 573.1, 10.1, 539.11; 345/173; 701/29, 30, 29.1, 29.4, 32.6, 33.2, 34.4
See application file for complete search history.

(56) References Cited

U.S. PATENT DOCUMENTS

| | | | |
|---|---|---|---|
| 6,131,060 A * | 10/2000 | Obradovich et al. | 340/461 |
| 6,667,726 B1 * | 12/2003 | Damiani et al. | 340/461 |
| 7,116,216 B2 * | 10/2006 | Andreasen et al. | 340/461 |
| 7,683,771 B1 * | 3/2010 | Loeb | 340/461 |
| 7,786,851 B2 | 8/2010 | Drew et al. | |
| 7,835,857 B2 | 11/2010 | Gretton | |
| 8,026,902 B2 | 9/2011 | Medler et al. | |
| 8,164,574 B2 | 4/2012 | Matsumoto et al. | |
| 2004/0036601 A1 * | 2/2004 | Obradovich | 340/425.5 |
| 2006/0192769 A1 * | 8/2006 | Pinkus et al. | 345/173 |
| 2009/0079705 A1 * | 3/2009 | Sizelove et al. | 345/173 |
| 2009/0244017 A1 * | 10/2009 | Pala et al. | 345/173 |

* cited by examiner

*Primary Examiner* — Thomas Mullen
(74) *Attorney, Agent, or Firm* — Baker Botts LLP

(57) ABSTRACT

In one embodiment, a vehicle includes a dashboard including one or more touchscreen displays; a wireless network interface; and multiple icons for presentation by one or more of the touchscreen displays to a user in the vehicle. Each of one or more of the icons is configurable by the user through tactile interaction with the icon via one or more of the touchscreen displays. Each of the icons when presented to the user makes accessible to the user through one or more of the touchscreen displays particular functionality. The vehicle includes software associated with the icons that is operable to render the icons on the touchscreen displays and implement their functionality.

21 Claims, 12 Drawing Sheets

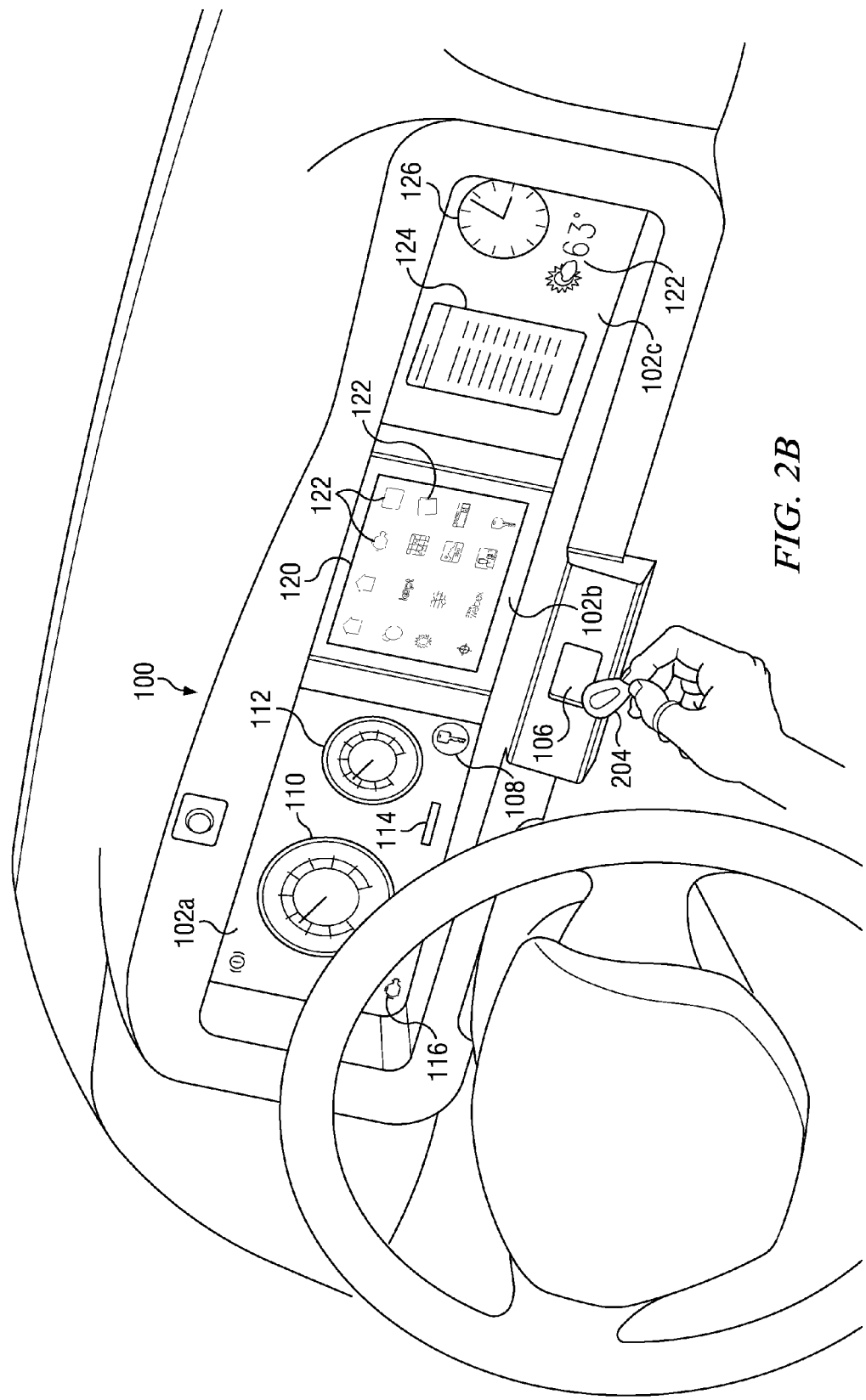

VIRTUAL DASHBOARD

RELATED APPLICATION

This application claims the benefit, under 35 U.S.C. §119 (e), of U.S. Provisional Patent Application No. 61/103,564, entitled Virtual Dashboard With Wireless Internet Connectivity, filed 7 Oct. 2008, and incorporated herein by reference.

TECHNICAL FIELD

The present disclosure relates generally to computer systems for vehicles, and more particularly to configurable or interactive touchscreen displays for vehicles.

BACKGROUND

Vehicles typically include features such as instrument panels, audio systems, climate control systems, navigation systems, and other vehicle features. Many vehicle features are independent of each other. For example, vehicles typically have one set of controls for the climate control system and a separate set of controls for the audio system.

BRIEF DESCRIPTION OF THE DRAWINGS

FIG. 2B illustrates example use of the device in FIG. 2A with the virtual dashboard in FIG. 1.

DESCRIPTION OF EXAMPLE EMBODIMENTS

Overview

Figure 1:
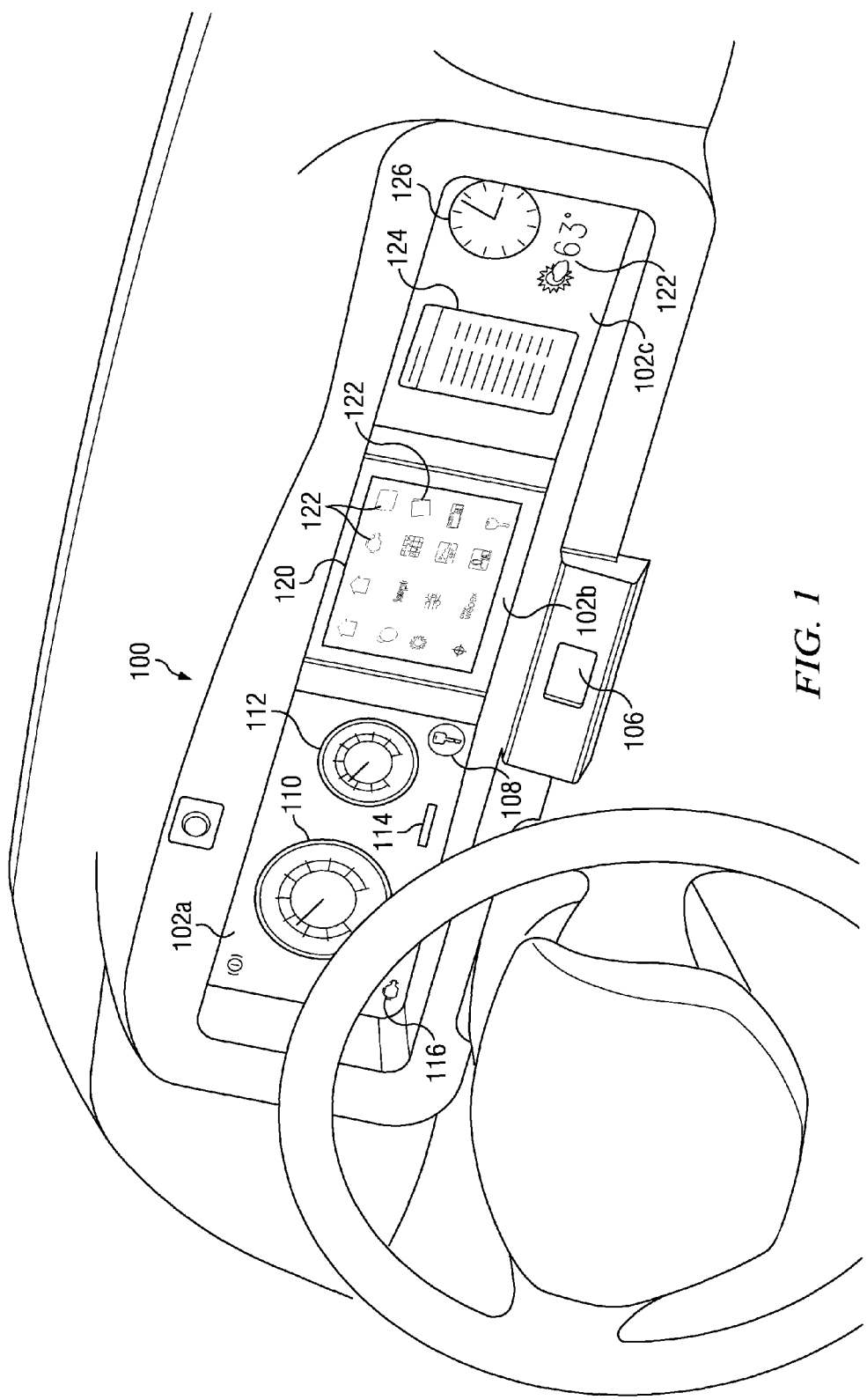
FIG. 1 illustrates an example virtual dashboard in an example vehicle.

In one embodiment, a vehicle includes a dashboard including one or more touchscreen displays; a wireless network interface; and multiple icons for presentation by one or more of the touchscreen displays to a user in the vehicle. Each of one or more of the icons is configurable by the user through tactile interaction with the icon via one or more of the touchscreen displays. Each of the icons when presented to the user makes accessible to the user through one or more of the touchscreen displays particular functionality. The vehicle includes software associated with the icons that is operable to render the icons on the touchscreen displays and implement their functionality.

Description

Particular embodiments relate to a virtual dashboard suitable for use in a vehicle. By way of reference, a dashboard (also referred to as a dash or "dial and switch housing") is generally a control panel typically positioned, by way of example, below the windshield of an automobile, and typically includes or contains the instrumentation and controls pertaining to the operation of the vehicle. By way of example, such instruments or controls may include a speedometer, a tachometer, an odometer, a fuel gauge, an engine temperature gauge, an oil pressure gauge, an indicator for gear-shift position, a seat-belt warning indicator, an engine malfunction indicator, inside and outside lighting controls, heating and ventilation controls including inside and outside temperature gauges, a clock, audio system controls, a navigation system, among others. In various example embodiments, the virtual dashboard may be particularly designed for an automobile, such as a car, van, or truck; however, in alternate embodiments, the virtual dashboard may be particularly suited for a motorcycle, train, or various watercraft (e.g., boat, ship, etc.) or aircraft (e.g., airplane, jet plane, helicopter, etc.) as well as spacecraft or hovercraft. In particular embodiments, a virtual dashboard includes an interactive display implemented via one or more touchscreen displays in which one or more of the instruments and controls, such as those described above, may be implemented via interactive icons. Furthermore, in particular embodiments, the virtual dashboard includes wireless internet connectivity functionality for communicating over a wireless network (e.g., a cellular network, a wireless local area network (WLAN), or wireless wide area network (WWAN)) with other computing systems or servers to transmit or receive information such as technical or diagnostic information related to operation of the vehicle, GPS location information, or information for interacting with or controlling other systems including home security systems, among others, as well as to enable internet browsing via a web browser rendered on the virtual dashboard, social networking, or audio and video conferencing.

In particular embodiments, the virtual dashboard is customizable or configurable by a user (e.g., operator) of the vehicle. By way of example, a user may add, remove, rearrange, resize, reshape, or otherwise customize or reconfigure various icons including instruments and controls displayed by the virtual dashboard "on the fly" through interaction with a corresponding touchscreen display. Furthermore, in particular embodiments, one or more users of the vehicle may each store his or her preferences within a storage medium located within the virtual dashboard or elsewhere in the vehicle or via a portable storage device that may then be accessed by the virtual dashboard prior to display of the user's customized virtual dashboard components.

In particular embodiments, the virtual dashboard reduces or eliminates the need for a car manufacturer to redesign and make new dashboards for new model cars.

FIG. 1 illustrates an example virtual dashboard 100 in an example vehicle. In the illustrated embodiment, virtual dashboard 100 includes three touchscreen displays 102a, 102b, and 102c (hereinafter referred to as touchscreen displays 102 or touchscreens 102), each of which may be angled to facilitate viewing by the driver of the vehicle. In particular embodiments, virtual dashboard 100 also includes an on-board vehicle computer system (not shown) that may be positioned, for example, within or behind virtual dashboard 100. Herein, reference to virtual dashboard 100 may encompass one or more touchscreens as well as one or more sensors, cameras, microphones, or speakers, where appropriate. Reference to the virtual dashboard 100 may also encompass one or more computer systems (e.g., the on-board computer system) or software components providing the features or functionality of the virtual dashboard 100 described herein.

In various embodiments, virtual dashboard 100 and touchscreen displays 102 may span substantially the entire length (or just a portion of the entire length) of the actual dashboard of the vehicle. Touchscreen displays 102 may be implemented using any suitable touchscreen display technology. By way of example, the touchscreen portions of touchscreen displays 102 may be implemented with capacitive, resistive, or surface acoustic wave (SAW) sensing technologies while the display portions of touchscreen displays 102 may be implemented using liquid crystal display (LCD) technology, light emitting diode (LED) technology, or organic LED (OLED) technology, among other suitable display technologies. Additionally, virtual dashboard 100 may include more than or fewer than three touchscreen displays 102 in various alternate example embodiments. In one particular alternate embodiment, virtual dashboard 100 includes only one touchscreen display spanning substantially the entire length of the actual dashboard of the vehicle. In such a single display embodiment, the single touchscreen display may be curved to facilitate viewing by the driver of the vehicle. By way of example, OLED technology may be used to implement such a curved touchscreen display.

A user (e.g., driver) of virtual dashboard 100 may interact with touchscreen displays 102 via a finger or stylus, for example. Additionally or alternately, a user may interact with virtual dashboard 100 using spoken instructions captured with one or more microphones positioned throughout the vehicle and processed via a speech or audio recognition system implemented behind virtual dashboard 100 or elsewhere in the vehicle. Additionally, the system implementing virtual dashboard 100 may include one or more speakers positioned throughout the vehicle for providing speech or other audio feedback or instruction to the user. By way of example, a virtual dashboard system may be configured to generate an interactive virtual assistant for presentation to the user via virtual dashboard 100. Such a virtual assistant may include various anthropomorphic characteristics including speech. In alternate embodiments, the virtual assistant may be heard but not be presented visually to the user (In some embodiments, a user may customize the virtual assistant one way or the other). Still further, a user may additionally or alternately interact with virtual dashboard 100 using physical motions captured via one or more cameras positioned throughout the vehicle and processed via a biometric-recognition system implemented behind virtual dashboard 100 or elsewhere in the vehicle.

Figure 2A:
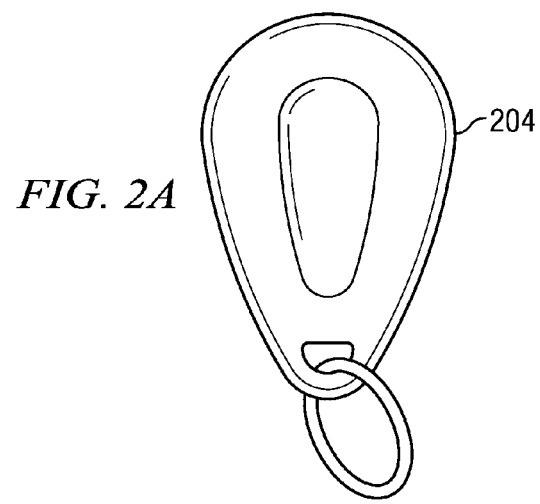
FIG. 2A illustrates an example small-form factor radio-frequency identification (RFID)-enabled device.

As described above, a user's preferences or settings for virtual dashboard 100 may be stored in the form of a user profile. In particular embodiments, the profiles including preferences or settings corresponding to each of one or more users of the vehicle, along with one or more default virtual dashboard configurations, may be stored within virtual dashboard 100. In such embodiments, a user's profile including preferences or settings may be associated with an RF identifier (RFID) or RFID tag in an RFID-enabled device, such as, by way of example, a key, key fob, or other small-form factor item. FIG. 2 illustrates an example small-form factor RFID-enabled device 204 implemented in the form of a key fob. By way of example, each user of the vehicle may have his or her own such device 204 associated with his or her own profile. In some embodiments, when a particular authorized user nears, enters, or turns on the vehicle, the key 204 wirelessly transmits the user's RFID to virtual dashboard 100 where the user's preferences or settings are stored. By way of example, in particular embodiments, virtual dashboard 100 may include one or more radio frequency identification (RFID) sensors or readers 106 for automatically detecting one or more RFID tags and subsequently, automatically configuring virtual dashboard 100 based on the received RFID tag. In FIG. 1, an RFID reader (sensor) 106 is located below virtual dashboard 100; however, in alternate embodiments, RFID reader 106 may be located in any other suitable location. FIG. 2B illustrates a user swiping or positioning a key 204 over RFID reader 106.

In particular embodiments, one or more touchscreen displays 102 or display portions of touchscreen displays 102 may be arranged or divided, respectively, such that one or more touchscreen displays 102 or display portions are specifically arranged for viewing by the driver while one or more other touchscreen displays 102 or display portions are arranged for viewing by front or rear passengers in the vehicle. The vehicle may further include one or more other displays, including touchscreen displays, positioned at one or more other locations throughout the vehicle (e.g., behind the driver seat) that may be similarly activated using RFID-enabled tags or keys.

In an alternate embodiment, virtual dashboard 100 may include a device reader into which the user can plug a storage device or medium that stores the user's profile. In another embodiment, a user may access and choose his or her settings by interacting with virtual dashboard 100 via one or more of the touchscreen displays 102. In still other embodiments, a speech or biometric recognition system may automatically detect the driver of the vehicle and configure the virtual dashboard 100 according to the driver's preferred settings. Still further, voice recognition, biometric recognition, or both may be based on the user profile associated with a particular RFID-enabled key 204.

In particular embodiments, one or more portions of the virtual dashboard may be "carried" (via a mobile storage device (which may be a component of a mobile telephone of the user)) or communicated wirelessly to one or more monitors and other components in the user's home or office or other location for use there in a substantially similar fashion as in the vehicle. Changes to the virtual dashboard entered by the user may be "carried" on a device the user has, like a mobile telephone, and used to create a substantially similar representation of one or more portions of the virtual dashboard at a location remote to the vehicle. Such changes may subsequently be transferred and implemented on virtual dashboard 100.

Furthermore, configurable business rules may be assigned to each profile and key 204 (if applicable). Such rules may be entered by a master user (e.g., a parent or owner of a car) via one or more interactive icons rendered via virtual dashboard 100. As an example and not by way of limitation, business rules assigned to one or more particular keys 204 (which may be keys belonging to one or more teenage sons or daughters of the automobile owner) may limit the automobile to being driven only within a determined radius (such as 10 miles) of a particular location, such as a home, or being driven only under a determined speed limit (such as 45 miles per hour). A key may also be tied to media in the automobile: e.g. music and video playlists and layout for a particular driver. In particular embodiments, if a user violates one or more of the rules, an on-board vehicle computer system associated with virtual dashboard 100 may generate one or more notifications to one or more predetermined addresses. For example, the notifications to predetermined addresses may include a text message to a predetermined telephone number or an e-mail to a predetermined e-mail address. In particular embodiments, the on-board vehicle computer system may require a password to modify the rules.

Figure 4:
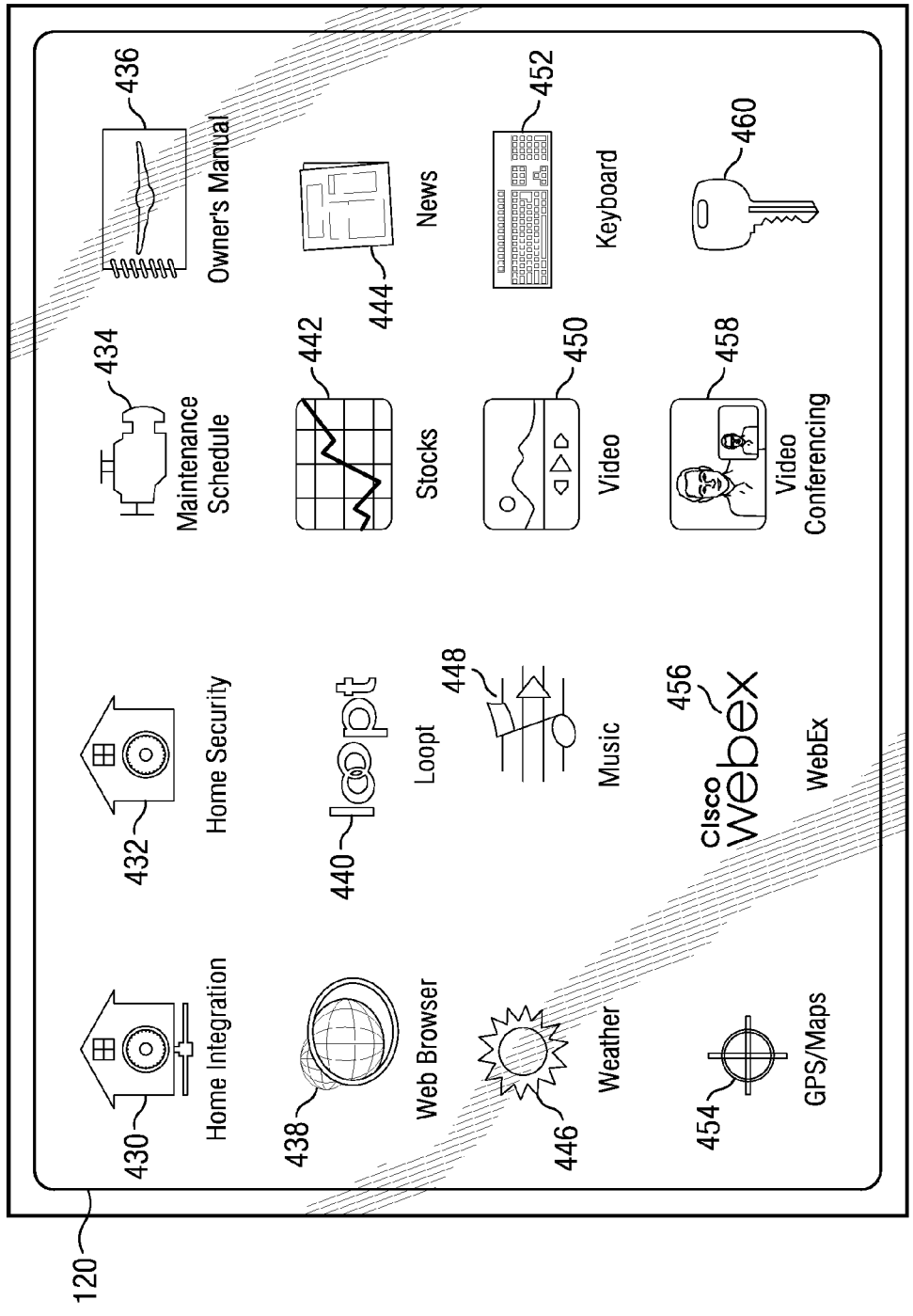
FIG. 4 illustrates an example application menu for presentation to a user via the virtual dashboard in FIG. 1.
Figure 5:
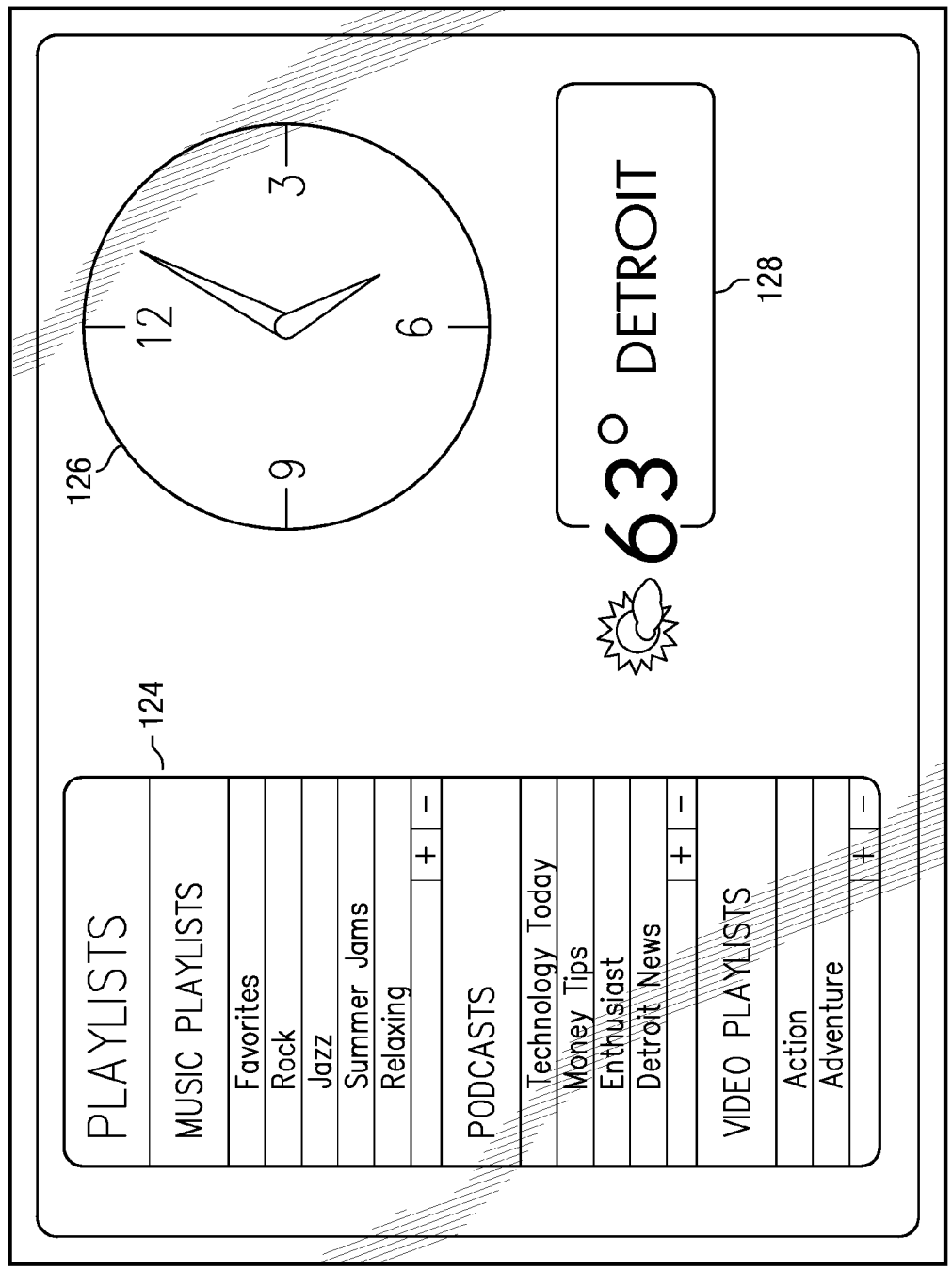
FIG. 5 illustrates example icons for presentation to a user via the virtual dashboard in FIG. 1.

In particular embodiments, virtual dashboard 100 and touchscreen display 102a are configured to display icons or visual components (hereinafter icons and visual components may be used interchangeable with regard to the virtual dashboard) such as, by way of example, start button 108, speedometer 110, tachometer 112, odometer 114, and engine malfunction indicator 116. By way of example, icons such as speedometer 110, tachometer 112, odometer 112 and other potentially displayed icons such as fuel, oil pressure, and temperature gauges generally relate to the operation of the vehicle while icons such as engine malfunction indicator 116 and other potentially displayed icons such as more specific diagnostic indicators may generally relate to one or more functional statuses of one or more vehicle components or systems (e.g., anti-lock braking system, drive train, tire pressure, etc.). These and other configurable icons may also indicate maintenance or other service needs or suggestions (e.g., a "get engine serviced" icon or "get oil change" icon). As an example and not by way of limitation, touchscreen display 102b may be configured to display an application or services menu 120 (as FIG. 4 illustrates) that includes various icons 122 representing various selectable applications, widgets, or services available to the user. Touchscreen display 102c may be configured to display a music or video playlist 124, a clock 126, and a weather indicator 128 that may include the outside temperature and weather conditions for a selected city or for the vehicles current location (e.g., as specified via GPS coordinates). Still other icons may include functionality relating to control of an audio or video system (e.g., volume and equalizer controls as well as playback controls for audio and video media) or to inside temperature controls.

Figure 3:
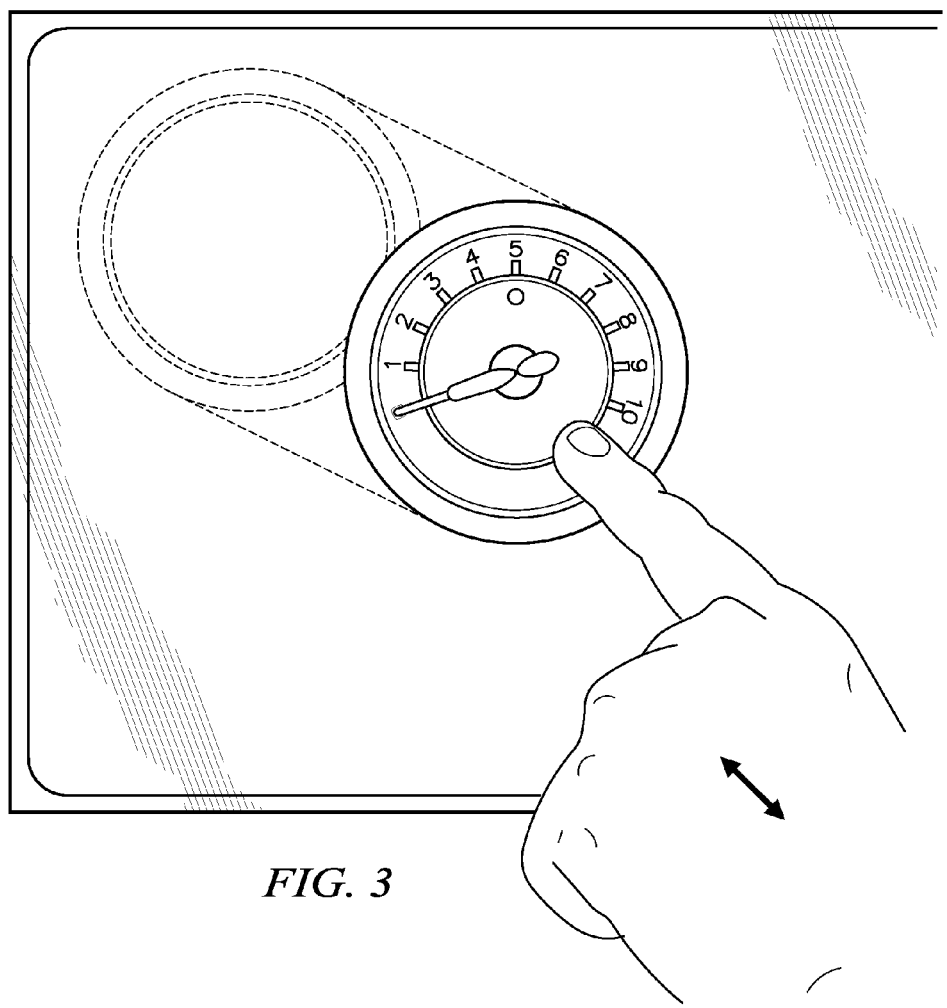
FIG. 3 illustrates example translation of an example icon across a touchscreen display of the virtual dashboard in FIG. 1.

As described above, the display of the components of virtual dashboard 100 may be highly configurable, with one or more of the icons being resizable, moveable, capable of changing color, shape, or other "skin" characteristics, capable of being closed or open, according to particular needs and preferences of a particular user. A user may even be able to download or otherwise import various customized icons 122. As is also described above, a user may provide input to the virtual dashboard 100 through tactile interaction with (e.g., touching) a touchscreen 102 of the virtual dashboard 100. Alternately or additionally, a user may provide input to virtual dashboard 100 through spoken instructions through voice-recognition functionality, or visually through a camera with biometric-recognition functionality. By way of example and not by way of limitation, referring to FIG. 3, a user may touch a touchscreen (e.g., 102a) displaying an icon representing a tachometer (e.g., icon 112) where the icon is displayed and manually drag or flick the icon to a different location on the touchscreen or to a different touchscreen (e.g., 102b or 102c) of the virtual dashboard 100. As another example, the user may speak out loud instructions to the virtual dashboard asking virtual dashboard 100 to open an application or activate one or more features associated with an icon on the virtual dashboard and, through voice-recognition functionality, the virtual dashboard may execute the instructions of the user. As another example, the user may shake his or her head from side to side indicating a negative response to a question the virtual dashboard 100 has audibly or visually presented to the user, and through a camera in or on the virtual dashboard and through biometric-recognition functionality, the virtual dashboard may carry out one or more processes according to the response communicated by the user. In particular embodiments, the virtual dashboard further includes emotion recognition functionality that uses input from one or more cameras, one or more microphones, or both of the virtual dashboard 100.

As described above with reference to FIGS. 1 and 4, in particular embodiments, the virtual dashboard 100 may display a menu or collection 120 of icons 122 representing associated applications, or services available to the user through the virtual dashboard 100. The menu 120 may itself be represented by a configurable icon enabling the user to open or close the menu by touching the icon. By way of example, upon touching (e.g., selecting) an icon 122, the icon may morph into or be replaced by an icon or interface providing access to the corresponding application. In one example embodiment, the icon or interface rendered after touching an associated icon 122 may be displayed in the region formerly occupied by menu 120; that is, the subsequent icon or interface may be rendered in place of the menu 120. A user may then close the subsequent icon or interface via, by way of example and not by way of limitation, a subsequent touch to a specified "close" button thereby causing virtual dashboard 100 to close the icon and re-render the menu 120. In alternate embodiments, the subsequent icon or interface may be rendered in a different position.

Figure 6:
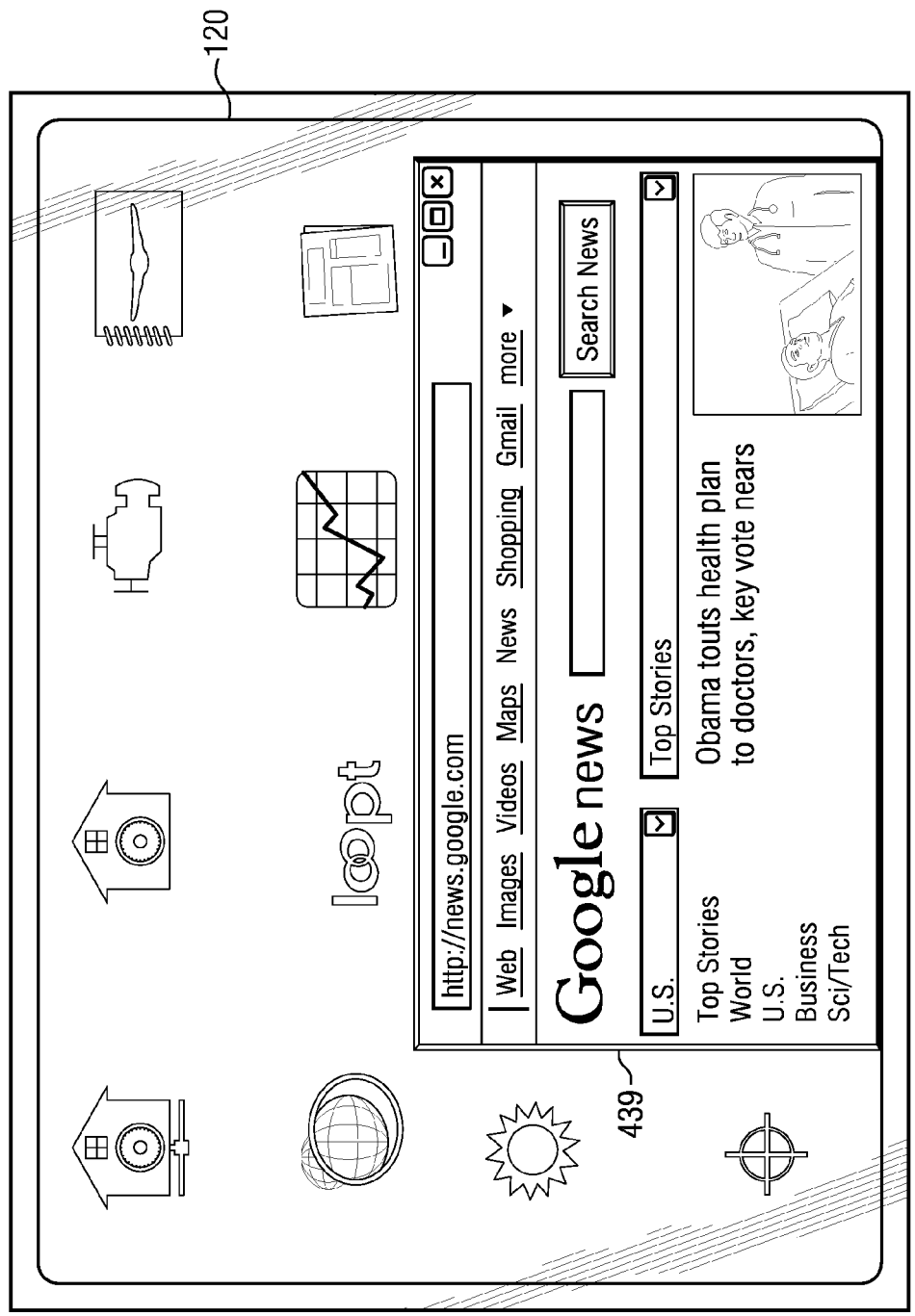
FIG. 6 illustrates an example web browser accessible to a user via the virtual dashboard in FIG. 1.
Figure 7:
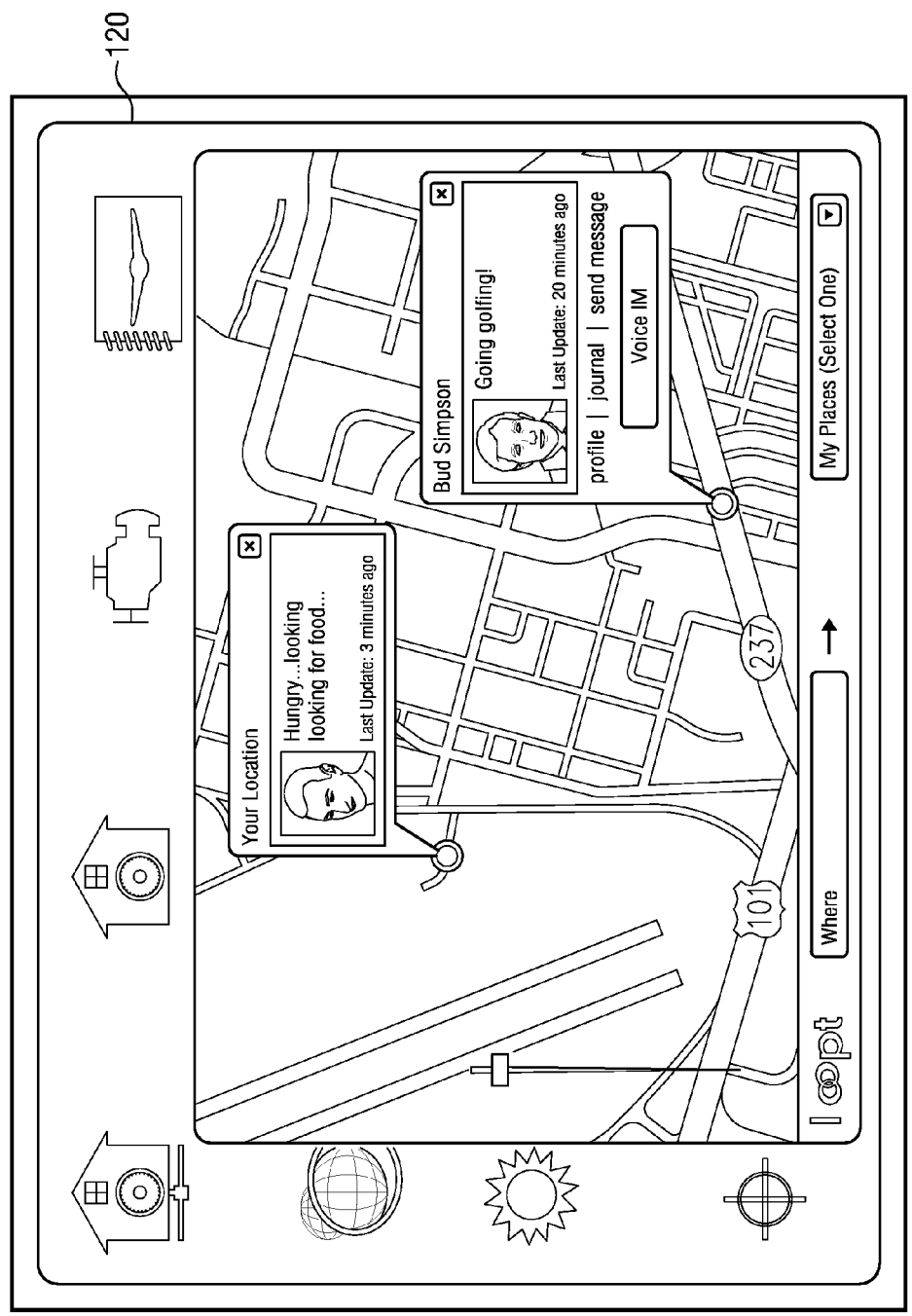
FIG. 7 illustrates an example social-networking service accessible to a user via the virtual dashboard in FIG. 1.

Example applications or services include may include home integration applications or services accessible via touching (e.g., selecting) icon 430. As another example, home security features (e.g., turning on or off a home security system or lighting) may be accessible via touching (e.g., selecting) icon 432. As another example, maintenance scheduling may be accessible via touching (e.g., selecting) icon 434. As another example, an electronic, interactive owner's manual may be accessible via touching (e.g., selecting) icon 436. As another example, a web browser may be accessible via touching (e.g., selecting) icon 438. By way of example, FIG. 6 illustrates an example web browser 439 rendered over a portion of menu 120 after selecting icon 438. Further, in an example embodiment a virtual keyboard or mouse may also be rendered in close proximity to web browser 439 upon selecting icon 438. As another example, an application providing features and functions similar to those provided by LOOPT (or access to LOOPT itself) may be accessible via touching (e.g., selecting) icon 440. FIG. 7 illustrates an example screen or interface that may be rendered over or in proximity to menu 120 after selecting icon 440 (again a virtual keyboard and mouse may also be automatically displayed). As another example, one or more real-time or historical stock-quote services may be accessible via touching (e.g., selecting) icon 442. As another example, one or more real-time or historical news services may be accessible via touching (e.g., selecting) icon 444. As another example, one or more real-time or historical weather services may be accessible via touching (e.g., selecting) icon 446. As another example, a music application (such as a media player with stored music files) or service (such as satellite radio) may be accessible via touching (e.g., selecting) icon 448, which, in one embodiment, may cause playlist 124 to be rendered. As another example, a video application (such as a media player with stored video files) or service (such as satellite video or television) may be accessible via touching (e.g., selecting) icon 450, which, in one embodiment, may cause a video window to be displayed that plays a video. As another example, a virtual keyboard may be accessible via touching (e.g., selecting) icon 452. The virtual keyboard rendered after selecting icon 452 may then be used to provide input to one or more other applications rendered by virtual dashboard 100.

Figure 8:
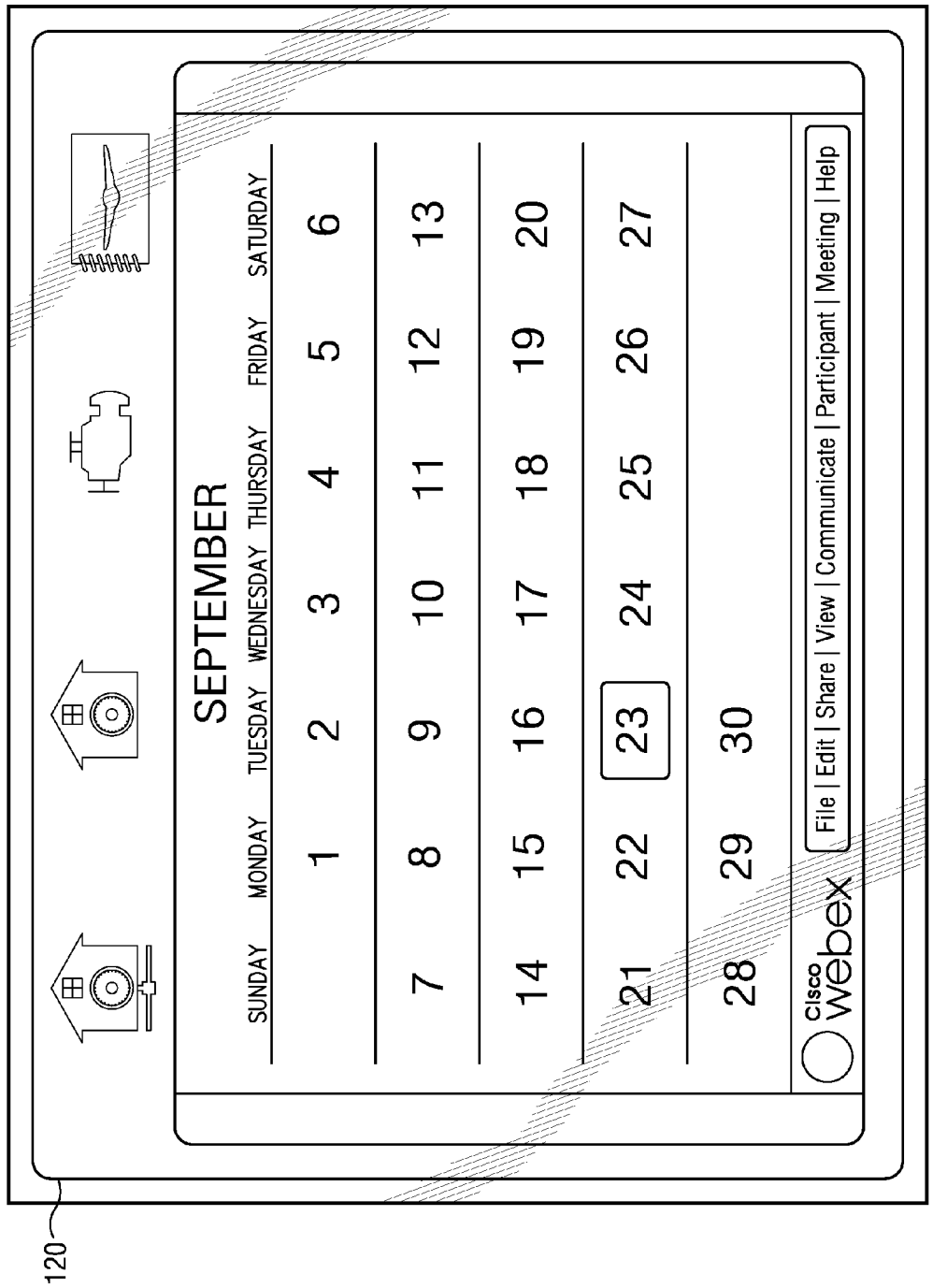
FIG. 8 illustrates an example WEBEX interface accessible to a user via the virtual dashboard in FIG. 1.

As another example, one or more global positioning system (GPS) enabled maps, navigation features or systems (including one or more real-time traffic services) may be accessible via touching (e.g., selecting) icon 454. As another example, a web conferencing application, such as WEBEX may be accessible via touching (e.g., selecting) icon 456. In an example embodiment, selecting icon 456 may result in the rendering of a calendar as illustrated in FIG. 8 as well as an interface for viewing video or documents. As another example, one or more videoconferencing applications or features may be accessible via selecting (e.g., touching) icon 458, resulting in an interface that displays one or more live or other video feeds of other users who have joined the videoconference. Further example icons may provide access to one or more concierge or other automobile telematics features or services, one or more emergency or roadside assistance services, or one or more dealer integration features or services. Other example applications or services that menu 120 may include are a user profile setup application, an application for identifying the closest gas stations or gas stations within a certain radius having the best gasoline prices and displaying maps to the same, or voice-controlled multimedia (music, movies, etc.) applications, the content of which the virtual dashboard may wirelessly synchronize with content stored by the user at a multimedia system at the user's home or office or other location.

The present disclosure contemplates any suitable menu 120 including any suitable applications or services available to the user through icons 122 rendered on one or more of the touchscreen displays 102 of virtual dashboard 100. In particular embodiments, as new applications for the automobile are developed and become available, the virtual dashboard 100 may download them for access and use by a user. A manufacturer of the automobile or a service provide may charge one or more fees (such as monthly or per use fees) for access to one or more applications or services through the virtual dashboard.

In particular embodiments, virtual dashboard 100 is network-enabled via a wireless network interface and capable of communicating wirelessly with one or more particular networks, such as one or more portions of the Internet via one or more portions of a cellular telephone or other wireless network. In particular embodiments, the wireless network interface may communicate with external computing devices, systems or servers over on or more wireless networks, such as a wireless local area network (WLAN) or a wireless wide area network (WWAN). For example, the wireless network interface may include an antenna and transceiver to communicate with any appropriate type of WLAN (such as a WLAN based on the Institute of Electrical and Electronics Engineers (IEEE) 802.11 standard) or any appropriate wireless stand-alone devices (such as Bluetooth-enabled devices). As another example, the wireless network interface may include an antenna and transceiver to communicate with any appropriate global positioning system (GPS). The wireless network interface further communicates with the on-board vehicle computer system to display information to a user. Additionally or alternately, a user may be able to couple his or her cellular phone to virtual dashboard 100 to provide wireless functionality.

Figure 9:
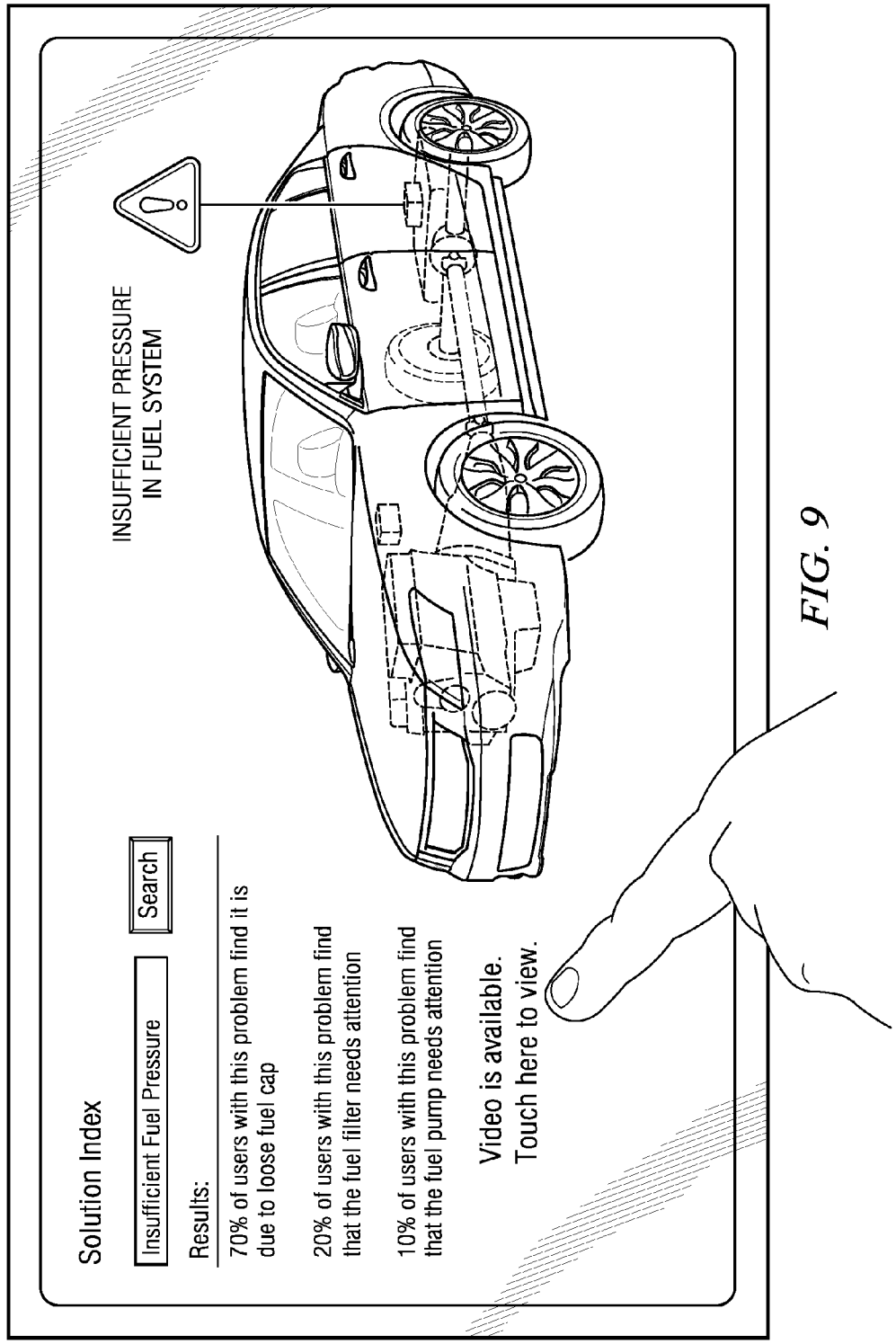
FIG. 9 illustrates an example vehicle diagnostic interface accessible to a user via the virtual dashboard in FIG. 1.

As an example and not by way of limitation, the engine malfunction indicator icon 116 may switch on (e.g., be rendered by one of touchscreens 102) as a result of one or more technical issues with the automobile's engine or associated components or systems. The user (who may be the driver of the automobile) may touch the touchscreen 102 at or near the display of the icon 116, and the automobile may communicate a diagnostic code for the technical issue to one or more social or other networks to find a potential cause of or potential solution to the technical issue. In addition or as an alternative, virtual dashboard 100 may communicate with a dealership or mechanic to obtain similar information, according to particular needs. The social network may return a video or tutorial or other information for display on one or more of the touchscreens 102 explaining the problem, its possible cause, or a possible solution to the user. Selecting icon 116 may also cause a diagnostic illustration of the vehicle to be rendered by virtual dashboard as illustrated in FIG. 9. Such a diagnostic illustration may further be supplemented with access to videos or other suggestions for resolving technical issues with the vehicle or access to communicate (e.g., using a virtual phone) with a mechanic.

Figure 10:
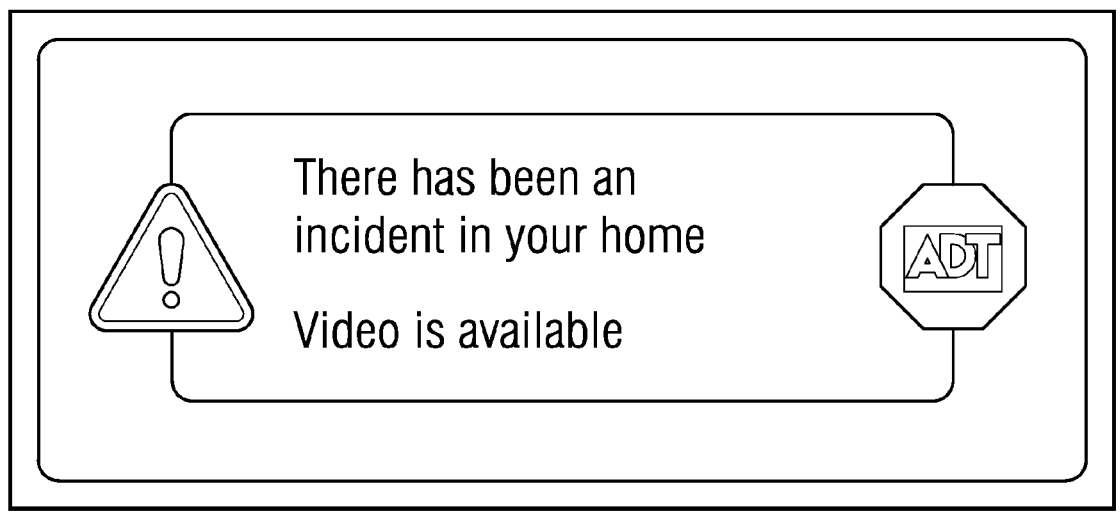
FIG. 10 illustrates an example home-security alert to a user via the virtual dashboard in FIG. 1.
Figure 11:
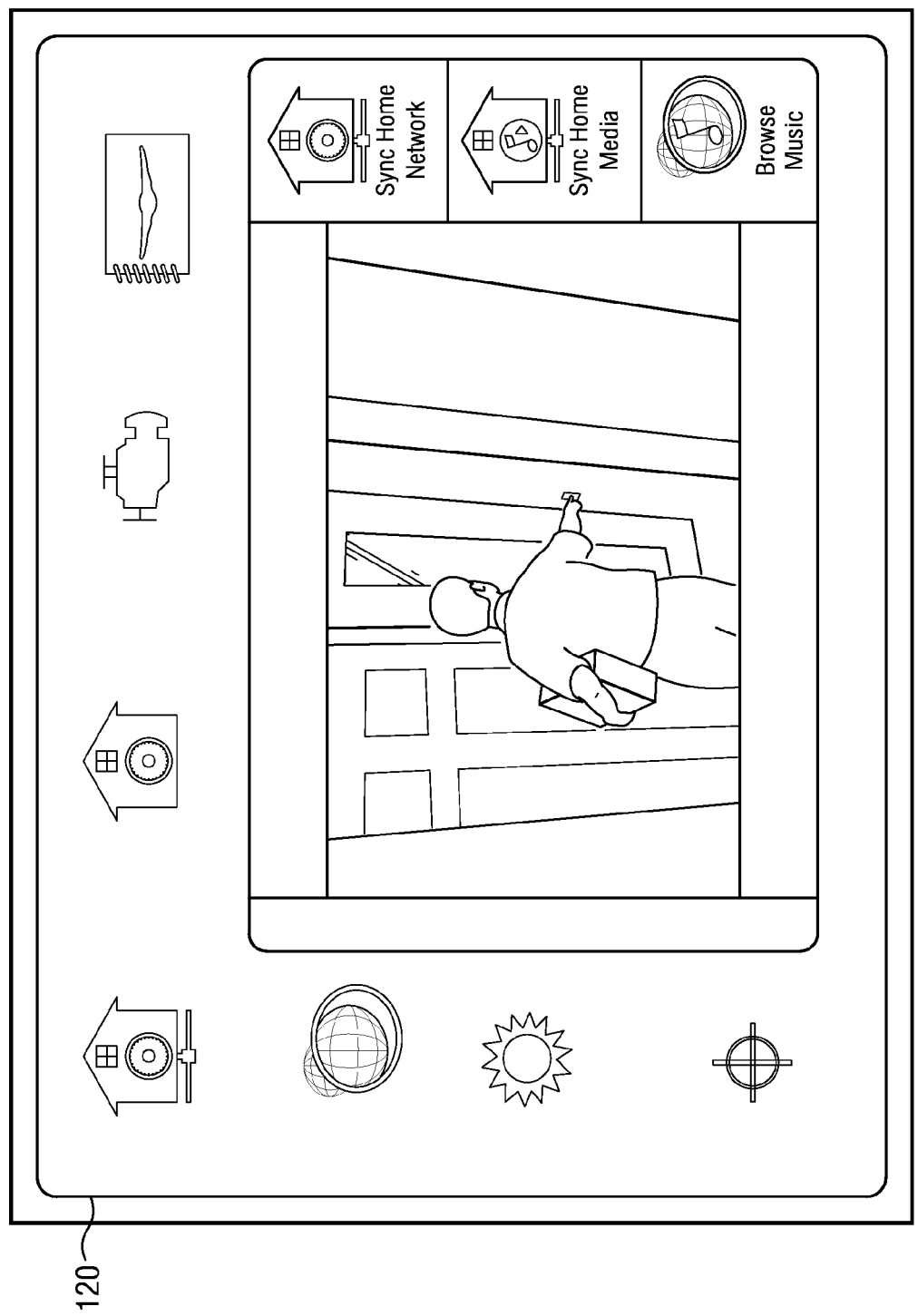
FIG. 11 illustrates an example video interface accessible to a user via the virtual dashboard in FIG. 1.

In particular embodiments, virtual dashboard 100 may be able to communicate with a home of the owner of the vehicle. As an example and not by way of limitation, virtual dashboard 100 may receive input from the user providing instructions for one or more systems of the home (e.g., lighting or security systems) to execute and communicate the instructions to the home for execution prior to the user arriving at home. As another example, virtual dashboard 100 may receive from the home a notification of an incident at the home for notification to the user. The home, through one or more user presence systems or methods, may "know" the user is not at the home. (For example, an RFID tag on the user or a device on the user or a mobile phone of the user may enable the home.) to detect the user leaving the home. The virtual dashboard 100, one or more user presence systems or methods may "know" the user is in the automobile. (For example, the RFID-enabled key of the user being in the automobile may enable the virtual dashboard 100 to detect the presence of the user in the automobile.) The home may locate the user by communicating with the virtual dashboard 100 and then communicate a message to the virtual dashboard for display by touchscreens 102 that there has been an incident at the home as illustrated in FIG. 10. The message may also be communicated to a mobile telephone or other device of the user in addition or as an alternative to being communicated to the virtual dashboard 100. The virtual dashboard 100 may then display in a window rendered by one of the touchscreens 102 of the virtual dashboard 100 a video of the incident as recorded by an automatically activated camera when the event (such as a delivery man ringing the doorbell to leave a package) occurred as illustrated in FIG. 11. The threshold for determining whether to notify the user in the automobile or elsewhere may be set to whatever level the user may want, e.g., only when a security system at the home has detected a break in or a fire.

In particular embodiments, when the vehicle is due for maintenance, virtual dashboard 100 may automatically notify the user via an icon displayed by a touchscreen 102 that the automobile is due for maintenance. In particular embodiments, upon display of such an icon, a user may touch the icon to access additional information associated with the underlying maintenance issue. By way of example, the maintenance icon 116 may itself not provide specific information as to which component or system of the vehicle requires maintenance; rather, upon the user touching the icon 116, the icon may morph into a subsequent icon that provides such additional information. Alternately, upon touching the icon 116, virtual dashboard 100 may display a second icon in the place of or in addition to icon 116 that provides the user with the additional information related to the underlying maintenance or other issue. In particular embodiments, virtual dashboard 100 may then access (via the wireless network interface) a schedule at a dealership or other mechanic shop (e.g., a preferred dealership or shop specified earlier by the user or the nearest dealership or mechanic shop as determined via GPS information) and compare the schedule with a calendar input earlier by the user (e.g., either manually or automatically by accessing a calendar within the user's cellular phone) to find one or more mutually available times for maintenance on the vehicle. The network-enabling of the virtual dashboard may enable the virtual dashboard to check the dealership's calendar. The user may select one of the identified dates (via one of the touchscreens 102 or one of the microphones) and the virtual dashboard 100 may then automatically schedule the appointment with the dealer.

In particular embodiments, virtual dashboard 100 may include functionality for voice-print analysis, which may enable the virtual dashboard to authenticate the user. As an example and not by way of limitation, virtual dashboard 100 may unlock a door to the vehicle based on the voice recognition and voice-print analysis if the user has locked himself or herself out of the vehicle, without the user having to contact an agent at a call center to have the vehicle unlocked remotely. In particular embodiments, virtual dashboard may be able to auditorily or visually identify the user for authentication purposes.

In particular embodiments, one or more ruggedized integrated services routers (ISRs) or other computer systems onboard the vehicle may collectively provide the input, output, processing, and wireless functionality of the virtual dashboard. The computer systems may include any suitable combination of hardware, software, or both for carrying out the features and functionality of the virtual dashboard 100 described herein. The computer systems may include multiple blades or cards for particular features or functions that may be readily replaced as enhanced, next-generation, superceding, or otherwise different features or functions become available.

Figure 12:
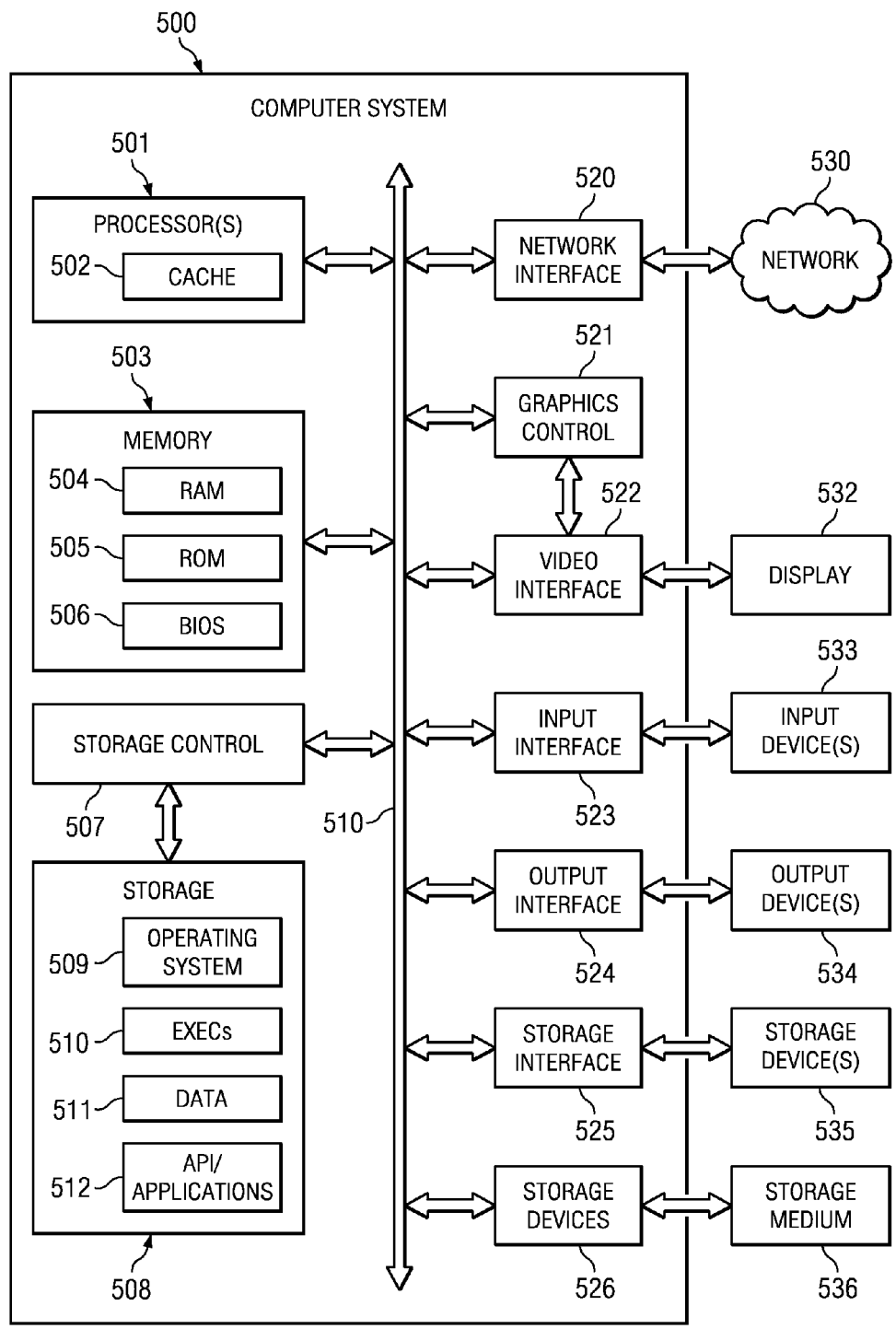
FIG. 12 illustrates an example computer system.

FIG. 12 illustrates an example computer system 500 that may be suitable for use in implementing various example embodiments of the virtual dashboard 100 described herein. As an example and not by way of limitation, one or more computer systems may execute particular logic or software to perform one or more steps of one or more processes described or illustrated with respect to virtual dashboard 100. One or more of the computer systems may be unitary or distributed, spanning multiple computer systems or multiple datacenters, where appropriate. The present disclosure contemplates any suitable computer system. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more computer-readable media may store or otherwise embody software implementing particular embodiments. A computer-readable medium may be any medium capable of carrying, communicating, containing, holding, maintaining, propagating, retaining, storing, transmitting, transporting, or otherwise embodying software, where appropriate. A computer-readable medium may be a biological, chemical, electronic, electromagnetic, infrared, magnetic, optical, quantum, or other suitable medium or a combination of two or more such media, where appropriate. A computer-readable medium may include one or more nanometer-scale components or otherwise embody nanometer-scale design or fabrication. Example computer-readable media include, but are not limited to, application-specific integrated circuits (ASICs), compact discs (CDs), field-programmable gate arrays (FPGAs), floppy disks, floptical disks, hard disks, holographic storage devices, magnetic tape, caches, programmable logic devices (PLDs), random-access memory (RAM) devices, read-only memory (ROM) devices, semiconductor memory devices, and other suitable computer-readable media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose computer system may execute software implementing particular embodiments, where appropriate.

The components in FIG. 12 are examples only and do not limit the scope of use or functionality of any hardware, software, embedded logic component, or a combination of two or more such components implementing particular embodiments. Computer system 500 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers. Computer system 500 includes a display 532 (e.g., implemented via touchscreens 102), one or more input devices 533 including touchscreen displays 102 (input devices 533 may also include, for example, include a keypad, a keyboard, a mouse, a stylus, etc.), one or more output devices 534 (which may, for example, include one or more speakers), one or more storage devices 535, and various storage media 536.

Bus 510 connects a wide variety of subsystems. Herein, reference to a bus encompasses one or more digital signal lines serving a common function, where appropriate. Bus 540 may be any of several types of bus structures including a memory bus, a peripheral bus, or a local bus using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, and an Accelerated Graphics Port (AGP) bus.

Processor(s) 501 (or central processing unit(s) (CPU(s))) optionally contains a cache memory unit 502 for temporary local storage of instructions, data, or computer addresses. Processor(s) 501 are coupled to storage devices including memory 503. Memory 503 includes random access memory (RAM) 504 and read-only memory (ROM) 505. ROM 505 may act to communicate data and instructions unidirectionally to processor(s) 501, and RAM 504 may act to communicate data and instructions bidirectionally with processor(s) 501. ROM 505 and RAM 504 may include any suitable computer-readable media described below. Fixed storage 508 is connected bidirectionally to processor(s) 501, optionally through storage control unit 507. Fixed storage 508 provides additional data storage capacity and may also include any suitable computer-readable media described below. Storage 508 may be used to store operating system 509, EXECs 510, data 511, application programs 512, and the like. Typically, storage 508 is a secondary storage medium (such as a hard disk) that is slower than primary storage. Information in storage 508 may, in appropriate cases, be incorporated as virtual memory in memory 503.

Processor(s) 501 is connected to multiple interfaces, such as graphics control 521, video interface 522, input interface 523, output interface 524, storage interface 525, and storage devices 526. These interfaces are in turn connected to appropriate devices, as illustrated. In general, an input/output (I/O) device may be a video display, a track ball, a mouse, a keyboard, a microphone, a touch-sensitive display, a transducer card reader, a magnetic- or paper- tape reader, a tablet, a stylus, a voice or handwriting recognizer, a biometrics reader, another computer system, or other suitable I/O device or a combination of two or more such I/O devices. Processor(s) 501 may connect to another computer system or to telecommunications network 530 through network interface 520. With network interface 520, CPU 501 may communicate with network 530 in the course of performing one or more steps of one or more processes described or illustrated herein, according to particular needs. Moreover, one or more steps of one or more processes described or illustrated herein may execute solely at CPU 501. In addition or as an alternative, one or more steps of one or more processes described or illustrated herein may execute at multiple CPUs 501 that are remote from each other across network 530.

In particular embodiments, when computer system 500 is connected to network 530, computer system 500 may communicate with other devices connected to network 530. Communications to and from computer system 500 may be sent through network interface 520. For example, network interface 520 may receive incoming communications (such as requests or responses from other devices) in the form of one or more packets (such as Internet Protocol (IP) packets) from network 530 and computer system 500 may store the incoming communications in memory 503 for processing. Computer system 500 may similarly store outgoing communications (such as requests or responses to other devices) in the form of one or more packets in memory 503 and communicated to network 530 from network interface 520. Processor (s) 501 may access these communication packets stored in memory 503 for processing.

Particular embodiments include storage with one or more computer-readable media encoding computer-executable code for carrying out computer-implemented operations. The media and computer-executable code may be specially designed or created for particular embodiments or well known and available to a person having ordinary skill in the art. Examples of computer-readable media include, but are not limited to, magnetic media (such as hard disks, floppy disks, and magnetic tape), optical media (such as CD-ROMs and holographic devices), magneto-optical media (such as floptical disks), and hardware devices specially configured to store and execute code, such as application-specific ICs (ASICs), programmable logic devices (PLDs), and ROM and RAM devices. Examples of computer-code include machine code, such as code produced by a compiler, and files containing higher-level code that a computer may execute with an interpreter.

Computer system 500 may provide functionality as a result of processor(s) 501 executing software embodied in one or more computer-readable storage media, such as memory 503. Memory 503 may store software that implements particular embodiments, and processor(s) 501 may execute the software. Memory 503 may read the software from one or more other computer-readable media (such as mass storage device (s) 535) or from one or more other sources through a suitable interface, such as network interface 520. The software may cause processor(s) 501 to carry out one or more processes or one or more steps of one or more processes described or illustrated herein. Carrying out such processes or steps may include defining data structures stored in memory 503 and modifying the data structures as directed by the software. In addition or as an alternative, computer system 500 may provide functionality as a result of logic hardwired or otherwise embodied in a circuit, which may operate in place of or together with software to execute one or more processes or one or more steps of one or more processes described or illustrated herein. Herein, reference to software may encompass logic, and vice versa, where appropriate. Moreover, reference to a computer-readable medium may encompass a circuit (such as an IC) storing software for execution, a circuit embodying logic for execution, or both, where appropriate. The present disclosure encompasses any suitable combination of hardware, software, or both.

The present disclosure encompasses all changes, substitutions, variations, alterations, and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

What is claimed is:

1. A vehicle comprising:
    a dashboard comprising one or more touchscreen displays;
    a wireless network interface;
    a plurality of icons for presentation by one or more of the touchscreen displays to a user in the vehicle, each of one or more of the icons being configurable by the user through tactile interaction with the icon via one or more of the touchscreen displays, each of the icons when presented to the user making accessible to the user through one or more of the touchscreen displays a particular functionality, the particular functionality comprising one or more of:
        conveying to the user information associated with one or more aspects of operation of the vehicle;
        conveying to the user information associated with a functional status of each of one or more systems of the vehicle;
        providing to the user access to one or more applications or services configured to utilize the wireless network interface;
        enabling the user to interact with one or more applications or services through tactile interaction with one or more of the plurality of icons via one or more of the touchscreen displays; or
        providing the user access to, and conveying to the user, information from one or more applications or services; and
    software associated with the icons that is operable to present the icons by the touchscreen displays to the user and to implement their functionality.

2. The vehicle of claim 1, wherein one or more of the icons are each configurable with respect to one or more of:
    position on the touchscreen displays;
    shape;
    size;
    color; or
    being hidden from presentation to the user.

3. The vehicle of claim 1, further comprising:
    one or more user profiles for each of a plurality of different users, each user profile indicating one or more settings for a particular one of the different users with respect to one or more of:
        presentation of one or more of the icons by one or more of the touchscreen displays to the user in the vehicle; or
        the functionality of one or more of the icons;

one or more radio-frequency identification (RFID) sensors that are operable to read one or more RFID-enabled devices that each identify one or more particular ones of the different users; and the software associated with the icons is further operable to:

access the user profile for a particular one of the different users when identified; and present one or more of the icons by the touchscreen displays or implement their functionality based on one or more of the settings in the user profile for a particular one of the different users when identified.

4. The vehicle of claim 1, further comprising a speech recognition system operable to enable the user to access or interact with one or more of the icons or their functionality by one or more audible instructions.

5. The vehicle of claim 1, wherein the icons that make accessible to the user functionality for conveying to the user information associated with one or more aspects of operation of the vehicle comprise one or more of:

a representation of a speedometer;
a representation of a tachometer;
a representation of an odometer;
a representation of a fuel gauge;
a representation of an oil-pressure gauge; or
a representation of an engine-temperature gauge.

6. The vehicle of claim 1, wherein the icons that make accessible to the user functionality for conveying to the user information associated with a functional status of each of one or more systems of the vehicle comprise one or more of:

an indicator of the functional status of an engine of the vehicle;

an indicator of the functional status of an antilock braking system (ABS) of the vehicle;

an indicator of the functional status of a drive train of the vehicle;

an indicator of air pressure in each of one or more tires of the vehicle;

an indicator of whether the user should have the vehicle checked by a mechanic; or an indicator of whether the user should have one or more fluids of the vehicle changed.

7. The vehicle of claim 1, wherein the icons that make accessible to the user functionality for providing to the user access to one or more applications or services are arranged in a customizable menu for presentation to the user by one or more of the touchscreen displays.

8. A system comprising:

a vehicle dashboard comprising one or more touchscreen displays;

a plurality of icons for presentation by one or more of the touchscreen displays to a user in the vehicle, each of one or more of the icons being configurable by the user through tactile interaction with the icon via one or more of the touchscreen displays, each of the icons when presented to the user making accessible to the user through one or more of the touchscreen displays a particular functionality, the particular functionality comprising one or more of:

conveying to the user information associated with one or more aspects of operation of the vehicle;

conveying to the user information associated with a functional status of each of one or more systems of the vehicle;

providing to the user access to one or more applications or services configured to utilize a wireless network interface on board the vehicle;

enabling the user to interact with one or more of the applications or services through tactile interaction with one or more of the plurality of icons via one or more of the touchscreen displays; or providing the user access to, and conveying to the user, information from one or more of the applications or services; and software associated with the icons that is operable to render the icons on the touchscreen displays and implement their functionality.

9. The system of claim 8, wherein one or more of the icons are each configurable with respect to one or more of:

position on the touchscreen displays;
shape;
size;
color; or
being hidden from presentation to the user.

10. The system of claim 8, further comprising:

one or more user profiles for each of a plurality of different users, each user profile indicating one or more settings for a particular one of the different users with respect to one or more of:

presentation of one or more of the icons by one or more of the touchscreen displays to the user in the vehicle; or the functionality of one or more of the icons;

one or more radio-frequency identification (RFID) sensors that are operable to read one or more RFID-enabled devices that each identify one or more particular ones of the different users; and the software associated with the icons is further operable to:

access the user profile for a particular one of the different users when identified; and present one or more of the icons by the touchscreen displays or implement their functionality based on one or more of the settings in the user profile for a particular one of the different users when identified.

11. The system of claim 8, further comprising a speech recognition system operable to enable the user to access or interact with one or more of the icons or their functionality by one or more audible instructions.

12. The system of claim 8, wherein the icons that make accessible to the user functionality for conveying to the user information associated with one or more aspects of operation of the vehicle comprise one or more of:

a representation of a speedometer;
a representation of a tachometer;
a representation of an odometer;
a representation of a fuel gauge;
a representation of an oil-pressure gauge; or
a representation of an engine-temperature gauge.

13. The system of claim 8, wherein the icons that make accessible to the user functionality for conveying to the user information associated with a functional status of each of one or more systems of the vehicle comprise one or more of:

an indicator of the functional status of an engine of the vehicle;

an indicator of the functional status of an antilock braking system (ABS) of the vehicle;

an indicator of the functional status of a drive train of the vehicle;

an indicator of air pressure in each of one or more tires of the vehicle;

an indicator of whether the user should have the vehicle checked by a mechanic; or an indicator of whether the user should have one or more fluids of the vehicle changed.

14. The system of claim 8, wherein the icons that make accessible to the user functionality for providing to the user access to one or more applications or services are arranged in a customizable menu for presentation to the user by one or more of the touchscreen displays.

15. A system comprising:
a plurality of icons for presentation by one or more of the touchscreen displays of a vehicle dashboard to a user in the vehicle, each of one or more of the icons being configurable by the user through tactile interaction with the icon via one or more of the touchscreen displays, each of the icons when presented to the user making accessible to the user through one or more of the touchscreen displays a particular functionality, the particular functionality comprising one or more of:
 conveying to the user information associated with one or more aspects of operation of the vehicle;
 conveying to the user information associated with a functional status of each of one or more systems of the vehicle;
 providing to the user access to one or more applications or services configured to utilize a wireless network interface on board the vehicle;
 enabling the user to interact with one or more of the applications or services through tactile interaction with one or more of the plurality of icons via one or more of the touchscreen displays; or
 providing the user access to, and conveying to the user, information from one or more of the applications or services; and
software associated with the icons that is operable to render the icons on the touchscreen displays and implement their functionality.

16. The system of claim 15, wherein one or more of the icons are each configurable with respect to one or more of:
position on the touchscreen displays;
shape;
size;
color; or
being hidden from presentation to the user.

17. The system of claim 15, further comprising:
one or more user profiles for each of a plurality of different users, each user profile indicating one or more settings for a particular one of the different users with respect to one or more of:
 presentation of one or more of the icons by one or more of the touchscreen displays to the user in the vehicle; or
 the functionality of one or more of the icons;
one or more radio-frequency identification (RFID) sensors that are operable to read one or more RFID-enabled devices that each identify one or more particular ones of the different users; and
the software associated with the icons is further operable to:
 access the user profile for a particular one of the different users when identified; and
 present one or more of the icons by the touchscreen displays or implement their functionality based on one or more of the settings in the user profile for a particular one of the different users when identified.

18. The system of claim 15, further comprising a speech recognition system operable to enable the user to access or interact with one or more of the icons or their functionality by one or more audible instructions.

19. The system of claim 15, wherein the icons that make accessible to the user functionality for conveying to the user information associated with one or more aspects of operation of the vehicle comprise one or more of:
a representation of a speedometer;
a representation of a tachometer;
a representation of an odometer;
a representation of a fuel gauge;
a representation of an oil-pressure gauge; or
a representation of an engine-temperature gauge.

20. The system of claim 15, wherein the icons that make accessible to the user functionality for conveying to the user information associated with a functional status of each of one or more systems of the vehicle comprise one or more of:
an indicator of the functional status of an engine of the vehicle;
an indicator of the functional status of an antilock braking system (ABS) of the vehicle;
an indicator of the functional status of a drive train of the vehicle;
an indicator of air pressure in each of one or more tires of the vehicle;
an indicator of whether the user should have the vehicle checked by a mechanic; or
an indicator of whether the user should have one or more fluids of the vehicle changed.

21. The system of claim 15, wherein the icons that make accessible to the user functionality for providing to the user access to one or more applications or services are arranged in a customizable menu for presentation to the user by one or more of the touchscreen displays.

* * * * *